United States Patent
Åström (10) Patent No.: US 10,281,947 B2
(45) Date of Patent: May 7, 2019

(54) MOUNTING ASSEMBLY FOR A CONTROL PEDAL OF A VEHICLE

(71) Applicant: CJ AUTOMOTIVE AB, Dalstorp (SE)

(72) Inventor: Bill Åström, Ringarum (SE)

(73) Assignee: CJ AUTOMOTIVE AB, Dalstorp (SE)

( * ) Notice: Subject to any disclaimer, the term of this patent is extended or adjusted under 35 U.S.C. 154(b) by 0 days.

(21) Appl. No.: 15/737,839

(22) PCT Filed: Jun. 23, 2016

(86) PCT No.: PCT/SE2016/050623
§ 371 (c)(1),
(2) Date: Dec. 19, 2017

(87) PCT Pub. No.: WO2016/209154
PCT Pub. Date: Dec. 29, 2016

(65) Prior Publication Data
US 2019/0004560 A1   Jan. 3, 2019

(30) Foreign Application Priority Data

Jun. 24, 2015   (SE) .................................... 1550871-6

(51) Int. Cl.
*G05G 1/30*   (2008.04)
*B60T 7/02*   (2006.01)
(Continued)

(52) U.S. Cl.
CPC .................. *G05G 1/44* (2013.01); *B60T 7/06* (2013.01); *F16C 11/04* (2013.01); *F16C 11/045* (2013.01); *B60K 26/02* (2013.01)

(58) Field of Classification Search
CPC ............ G05G 1/30; G05G 1/44; G05G 1/445; G05G 1/46; F16C 11/04; F16C 11/045; B60K 26/02; B60T 7/06
See application file for complete search history.

(56) References Cited

U.S. PATENT DOCUMENTS

| 5,398,569 A | 3/1995 | Carr |
| 5,588,338 A | 12/1996 | Carr et al. |

(Continued)

FOREIGN PATENT DOCUMENTS

| DE | 10336799 A1 | 3/2005 |
| DE | 102005034662 A1 | 2/2007 |
| EP | 1233321 A2 | 8/2002 |

OTHER PUBLICATIONS

International Search Report (dated Aug. 19, 2016) for corresponding International App. PCT/SE2016/050623.

*Primary Examiner* — Adam D Rogers
(74) *Attorney, Agent, or Firm* — WRB-IP LLP (57) ABSTRACT

A mounting assembly for a control pedal of a vehicle includes two walls arranged in parallel in relation to each other, a pivot shaft extending between the walls, two locking structures arranged to pivotally retain the pivot shaft in a use position between the walls, and at least a control pedal rigidly provided on the pivot shaft. The control pedal and the pivot shaft are rotatable around an axis of rotation. Further, the mounting assembly is provided with a joint including at least one lock protrusion provided on at least true of the locking structures and an internal groove provided on at least one of the walls. The at least one lock protrusion is arranged to engage with the internal groove, when the locking structure is in a use position. Further, the at least one of the locking structures further includes a rotating prevention protrusion extending radially from an outer surface of the locking structure, the rotating prevention protrusion being arranged to engage with a stop arranged at the at least one of the walls, when in the use position.

15 Claims, 9 Drawing Sheets

(51) Int. Cl.
  *B60K 26/02*   (2006.01)
  *F16C 11/04*   (2006.01)
  *G05G 1/44*    (2008.04)
  *B60T 7/06*    (2006.01)

(56) References Cited

U.S. PATENT DOCUMENTS

| | | | |
|---|---|---|---|
| 5,673,589 A * | 10/1997 | Arao | B60T 7/06 |
| | | | 74/512 |
| 5,855,146 A | 1/1999 | Papenhagen et al. | |
| 6,612,200 B1 | 9/2003 | Rixon | |
| 7,108,444 B2 * | 9/2006 | Burgstaler | F16C 11/02 |
| | | | 403/150 |
| 7,261,015 B2 | 8/2007 | Williams et al. | |
| 9,639,112 B2 * | 5/2017 | Fuller | G05G 1/44 |
| 9,645,600 B2 * | 5/2017 | Willemsen | B60T 7/06 |
| 2006/0222456 A1 | 10/2006 | Villa et al. | |
| 2013/0133472 A1 | 5/2013 | Burgeura et al. | |
| 2014/0290425 A1 * | 10/2014 | Kaijala | G05G 1/44 |
| | | | 74/512 |
| 2017/0262010 A1 * | 9/2017 | Kumazawa | F16C 17/10 |

\* cited by examiner

MOUNTING ASSEMBLY FOR A CONTROL PEDAL OF A VEHICLE

BACKGROUND AND SUMMARY

The present invention relates generally to a mounting assembly for a control pedal of a vehicle.

In the vehicle industry, the manufacturers strive towards a more time efficient and cost-conscious assembly of the vehicles, this to minimize the manufacturing cost. Further, the manufacturers also strive towards a simple design of the included components and sometimes also with integrated multiple functionalities which imply that less components are needed. A component design with few components that are time efficient to assembly are thus worth aiming at to achieve a cost efficient assembly.

From prior art it is known multiple mounting assemblies for control pedals in vehicles. In U.S. Pat. No. 5,588,338 a mounting for a control pedal in a motor vehicle is described. The mounting includes a mourning bracket fixed relative to the vehicle having apertures defining an axis of rotation. The pedal has a hub defining pivot axis. In the hub spring loaded bearings are adapted to automatically snap axially outward from a first position to a second position, thereby rotatably connecting the pedal with the bracket, when the pivot axis is aligned with the axis of rotation. Pedal end caps are snapped onto the hub and interposed between the hub and the bracket. A drawback with the mounting assembly according to prior art is that it is composed of several individual components which makes the assembly of the mounting assembly time consuming and also expensive to manufacture, due to the large amount of included components.

It is desirable to create a mounting assembly for a control pedal of a vehicle, which mounting assembly achieves an improved and shortened assembly time. Further, it is desirable to provide a mounting assembly with a robust, and reliable mourning assembly with freedom from play.

The mounting assembly for a control pedal of a vehicle according to an aspect of the invention comprises two walls arranged in parallel in relation to each other, a pivot shaft extending between the walls, two locking means arranged to pivotally retain the pivot shaft in a use position between the walls, at least a control pedal rigidly provided on the pivot shaft, which control pedal and pivot, shaft are rotatable around an axis of rotation.

Further, the mounting assembly is provided with a joint which comprises at least one lock protrusion provided on at least one of the locking means and an internal groove provided in at least one of the walls, which internal groove the at least one lock protrusion is arranged to engage with when the locking means is in a use position. By the locking means having a lock protrusion arranged to engage with an internal groove of the wall, a controlled rotational and axial movement of the locking means in relation to the wall is achieved when the locking means is moved into a use position. The at least one of the locking means further comprises a rotating prevention protrusion extending radially from an outer surface of the locking means, the rotating prevention protrusion being arranged to engage with a stop arranged on the at least one of the walls when the locking means is in the use position. Such a rotating prevention protrusion in co-operation with the stop prevents the locking means from rotating in relation to the wall when in the use position.

The at least one lock protrusion may be radially extending from an outer surface of the locking means.

The at least one lock protrusion may be provided with a lock protrusion parts, whereof first and second lock protrusion parts are arranged to engage with the internal groove and a third lock protrusion part is arranged to mesh with an internal side of at least one of the walls. The first and second lock protrusion parts are arranged as side parts and the third lock protrusion part is arranged centrally in between the first and second lock protrusion parts. The third lock protrusion part is arranged to mesh with a stop arranged on the inner side of the wall, when in the use position.

The at least one locking means may be provided with a grip for enabling movement of the locking means from an insertion position to the use position. The grip may for example be a hex key grip.

Each wall of the mounting assembly may be provided with a through opening with a shape complementary to the outer circumferential shape of the locking means, so as to be able to insert the locking means into the through opening. The mounting assembly is preferably manufactured of a polymeric material.

According to an embodiment, the stop is a second indentation into the wall from an outer side of the wall that is to co-operate with the rotation preventing protrusion. Hereby, rotation of the locking means in relation to the wall is prevented as the rotation preventing protrusion meshes with the second indentation. The rotation preventing protrusion may have a shape substantially complementary to the shape of the second indentation. The second indentation may extend from an opening of the wall, i.e. the indentation is reached from the outside of the wall as well as from the opening.

According to another embodiment, the locking means further comprises one or more axial securing protrusions protruding in a radial direction from the outer surface of the locking means, the axial securing protrusions being arranged at a second axial end of the locking means. Hereby, the axial securing protrusions will co-operate with the inner wall when the locking means have been inserted into the use position, thereby preventing any movement of the locking means in an axial direction back out of the opening.

According to another embodiment, the axial securing protrusions and/or the rotation prevention protrusion are deflectable in a radial direction of the locking means. Hereby, the rotation prevention protrusion can snap into the second indentation when the locking means are inserted into the use position so as to prevent that the rotation prevention protrusion falls out of the second indentation again. In a similar way, the axial securing protrusion being deflectable makes the axial securing protrusions snapping outwardly inside the wall when the locking means have reached the use position. Hereby the axial securing protrusion will bear against the inner side of the wall so as to prevent axial movement of the locking means.

BRIEF DESCRIPTION OF DRAWINGS

The invention is now described, by way of example, with reference to the accompanying drawings in which.

DETAILED DESCRIPTION

In the following, a detailed description of a mow ting assembly 1 according to the invention is disclosed in detail in respect of embodiments and in reference to the accompanying drawings. All examples herein should be seen as part of general description and therefore possible to combine in any way in general terms.

Figure 1:
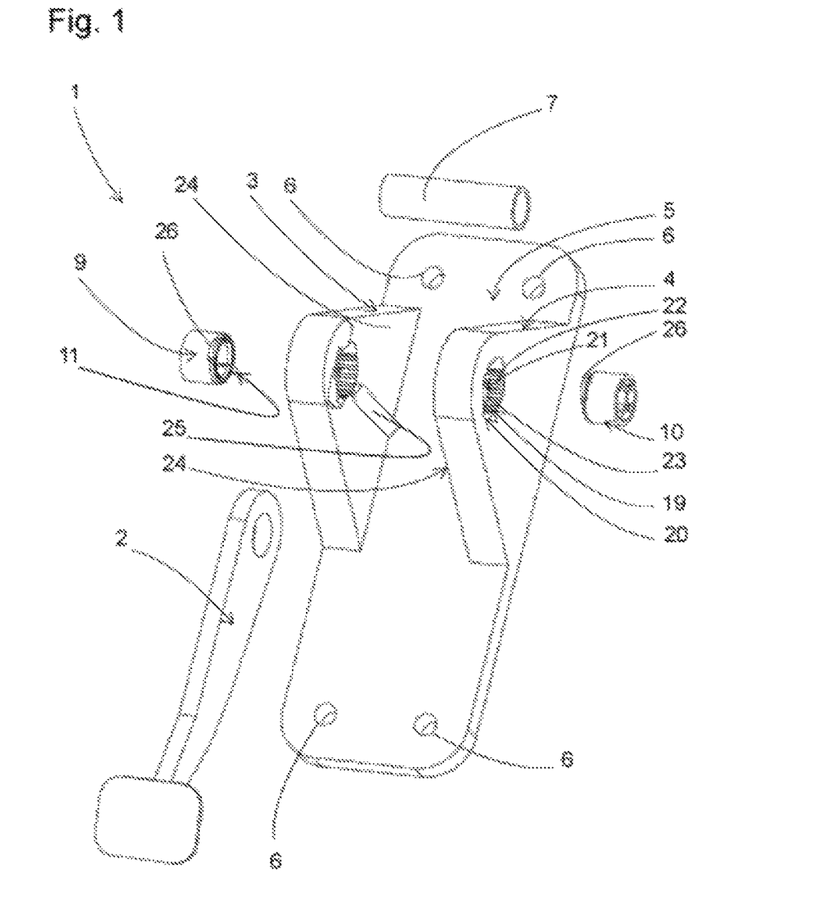
FIG. 1 shows a exploded isometric view of a mounting assembly according to the invention.
Figure 2:
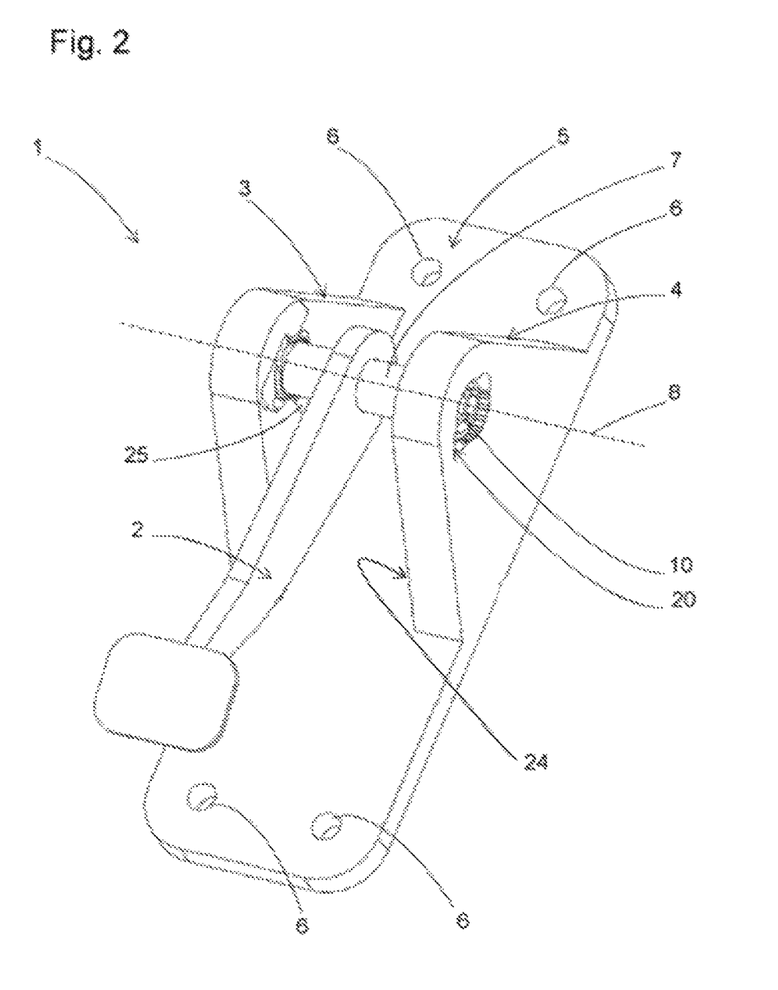
FIG. 2 shows an isometric view in an assembled state of the mounting assembly.

FIG. 1 shows an exploded isometric view and FIG. 2 shows an isometric view in an assembled state of the mounting assembly 1. The mounting assembly 1 is arranged for pivotally supporting one or more control pedals 2 of a vehicle. The control pedal 2 may be a brake pedal, a clutch pedal or an accelerator pedal, or a group of two or more such pedals mounted on a single axis of rotation 8.

The mounting assembly 1 comprises two walls 3, 4 arranged in parallel in relation to each other. The walls 3, 4 are rigidly joined together by means of a rear wall 5. The walls 3, 4 are preferably generally perpendicularly arranged in relation to the rear wall 5, which rear wall 5 is provided with mounting holes 6 by means of which the mounting assembly 1 is fixed to the interior of the vehicle. The walls 3, 4 are also connected by means of a pivot shall 7 which extend between the walls 3, 4. The pivot shaft 7 is preferably a cylindrical member, hollow or solid, but may also have any other configuration that is suitable for its use. At least a control pedal 2 is rigidly provided on the pivot shaft 7, such that the control pedal 2 may rotate in unison with the pivot shaft 7. In the center point of the cylindrical pivot shaft 7 an axis of rotation 8 is arranged, around which the control pedal 2 and the pivot shaft 7 may rotate. Two locking means 9, 10 are arranged to pivotally retain the pivot shaft 7 in a use position between the walls 3, 4.

The mounting assembly 1 is provided with a bayonet joint which comprises at least one lock protrusion 11 provided on at least one of the locking means 9, 10. In one embodiment the walls 3, 4 may be provided with at least a wall protrusion (not shown). The lock protrusion 11 and wall protrusion (not shown) are arranged to mesh with each other when the locking means 9, 10 is in the use position, thereby preventing pivotal movement of the two locking means 9, 10 in relation to the walls 3, 4, when in the use position.

Figure 3:
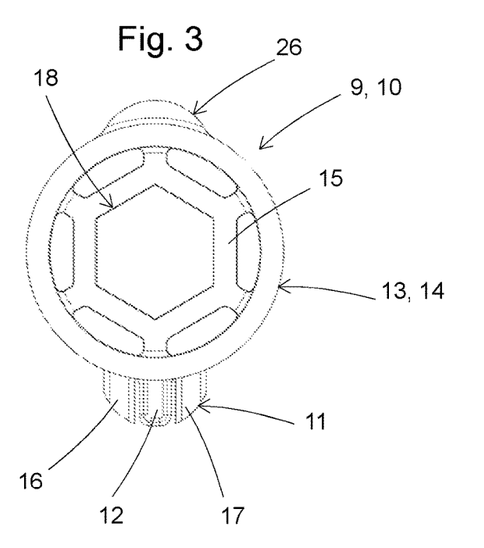
FIG. 3 shows atop view of a locking means according to the invention.
Figure 4:
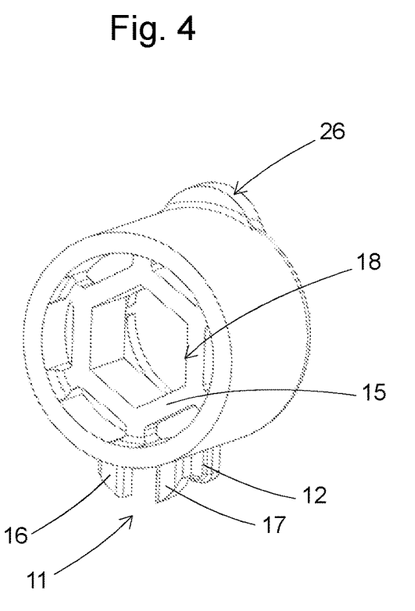
FIG. 4 shows a isometric view of the locking means according to the invention.
Figure 5:
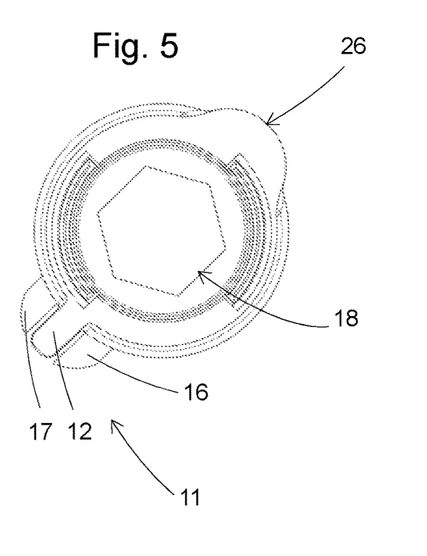
FIG. 5 shows a bottom view of the locking means according to the invention.

FIG. 3-5 shows the locking means 9, 10. The locking means 9, 10 is a cylindrical shaped casing, which in a cross section taken along the axis of rotation 8 is substantially U-shaped. The function of the locking means 9, 10 is to hold the pivot shaft 7 and its control pedal 2 securely in place between the walls 3, 4, but also to minimize the play between the pivot shaft 7 and the walls 3, 4 and to act as a bearing for the pivot shaft 7, when a user applies a force to the control pedal 2 by means of a foot and the pivot shaft 7 rotates around the axis of rotation 8.

The locking means 9, 10 comprises a side wall 13 with an outer surface 14 and a closing wall 15. The side wall 13 is shaped as a hollow tube which is closed in an end by means of the closing wall 15. An inner diameter of the locking means 9, 10 of the hollow tube is larger than an outer diameter of the pivot shaft 7. This to allow the pivot shall 7 to rotate within the locking means 9, 10 when the control pedal 2 is operated by a driver of the vehicle.

In one embodiment, at least one of the locking means 9, 10 is provided with the at least one lock protrusion 11. In an alternative embodiment the locking means 9, 10 may be provided with two or more lock protrusions 11, and thus, also the wall 3, 4 is provided with two or more wall protrusions (not shown). The lock protrusion 11 extend in a radially direction, in relation to a center axis 8 of the hollow tube, from the outer surface 14 of the locking means 9, 10. The lock protrusion 11 may be provided with a cavity (not shown) with a radial extension. The cavity (not shown) may preferably have a semicircular shape, or any other suitable shape. The cavity (not shown) is arranged to mesh with the wall protrusion (not shown) which is provided with a complementary shaped engagement surface (not shown) as the cavity (not shown). Preferably, the cavity (not shown) of the lock protrusion 11 may be provided with corrugations, this to improve the locking action between the wall protrusion (not shown) and the lock protrusion 11. The lock protrusion 11 comprises preferably resilient material properties this to enable the lock protrusion 11 to deflect in an axial direction along the axis of rotation 8 and to achieve the locking action. In another embodiment the resilient properties of the locking means 9, 10 is provided by a resilient means (not shown) between the pivot shaft 7 and the at least one locking means 9, 10, so that the resilient means is pushed outwards in an axial direction of the pivot shaft 7 by the resilient means. One example of the resilient means may be a coil spring.

At least one of the locking means 9, 10 is provided with a grip 18 for enabling movement of the locking means 9, 10 from an insert position to the use position. The grip 18 may for example be a hex grip for a hex key. The grip 18 may also have any other suitable design.

Each wall 3, 4 of the mounting assembly 1 is provided with a through opening 19. The openings 19 are mainly of a circular design and the axis of rotation 8 for the pivot shaft 7 is provided in the center points of the openings 19. The openings 19 are provided with at least an indentation 20 in the wall 3, 4 along the circumference of the circular opening, which indentation 20 render it possible to insert the locking means 9, 10 into the wall 3, 4 at the insertion position. After the locking means have been inserted into the wall at the indentation, the locking means are twisted e.g. 90 degrees over the bayonet lock into the use position where the pivot shaft 7 is locked in place. The shape of the openings 19 are provided with a shape complementary to the outer circumferentially shape of the locking means 9, 10.

At least one of the walls 3, 4 is provided with an internal groove 21. The groove 21 extends partly or wholly around a circumferential envelope surface 22 of the opening 19. The groove 21 may extend along 45°-135°, preferably around 90° of the circumferential envelope surface 22 of the opening 19. As the groove 21 extends partly around the circumferential envelope surface 22, it ends inside the wall 3, 4 thereby preventing rotation movement of the locking means any further than that the lock protrusion 11 comes to the end of the groove 21. The groove 21 preferably starts at the indentation 20 in the wall opening 19.

In one embodiment the internal groove 21 may be provided with the wall protrusion (not shown), the wall protrusion extending axially in the direction of the axis of rotation 8 and is provided on an edge 23 of the circumferentially extending groove 21. In another embodiment the wall protrusion (not shown) is provided on an internal side 24 of the at least one wall 3, 4.

In one preferable embodiment, the lock protrusion 11 is arranged to engage with the internal groove 21, in the use position. The lock protrusion 11 may be provided with three lock protrusion parts 12, 16, 17. A first and a second of the three lock protrusion parts are preferably arranged as side parts 16, 17 of the lock protrusion 11, and a third of the three lock protrusion parts 12 is arranged centrally in between the lock protrusion side parts 16, 17. Further, the lock protrusions side parts 16, 17 may be axially displaced from the central lock protrusion part 12. The first and second lock protrusion parts 16, 17 may be arranged to engage with the internal groove 21 and the third lock protrusion part 12 may be arranged to mesh with an internal side 24 of the walls 3, 4, in the use position. The lock protrusion side parts 16, 17 are arranged to minimize axial play between the locking means 9, 10 and the wall 3, 4. The lock protrusion side parts 16, 17 mesh with the edge 23 of the internal groove 21. The central lock protrusion part 12 is arranged as a rotation stop, which prevents the locking means 9, 10 from rotating back when the mounting assembly 1 is in the use position. The central lock protrusion part 12 is arranged to abut against a stop 25, arranged on the internal side 24, when in the use position to prevent rotation back of the locking means. The abutment of the central lock protrusion part 12 against the stop 25, provides that axial forces may act on the locking means 9, 10 without rupture of the locking means 9, 10. Further, the locking means 9, 10 is provided with a securing protrusion 26 provided on a side wall 13 and preferably arranged opposite the lock protrusion 11.

Figure 6:
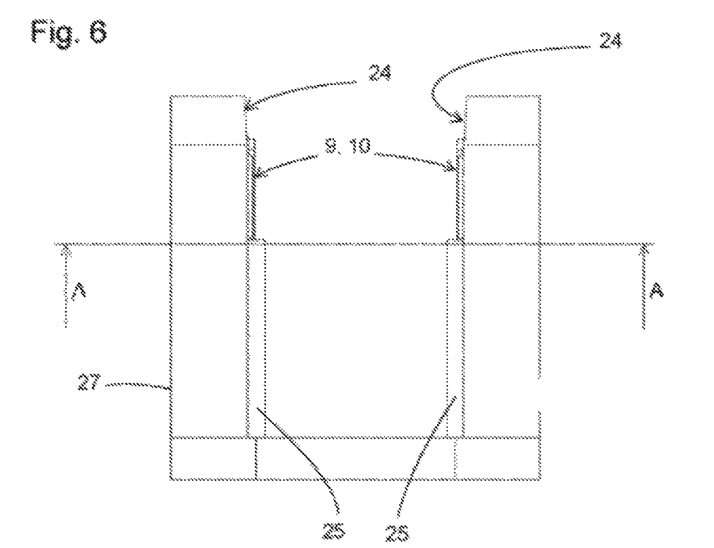
FIG. 6 shows a side view of the mounting assembly.
Figure 7:
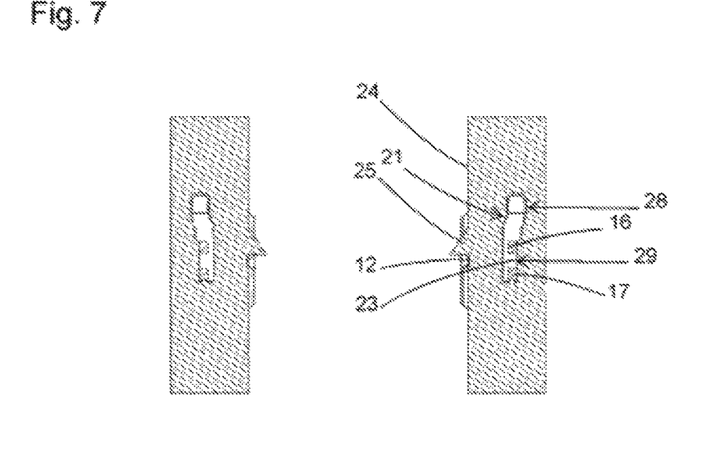
FIG. 7 shows a section view according to section A-A shown in FIG. 6.
Figure 8:
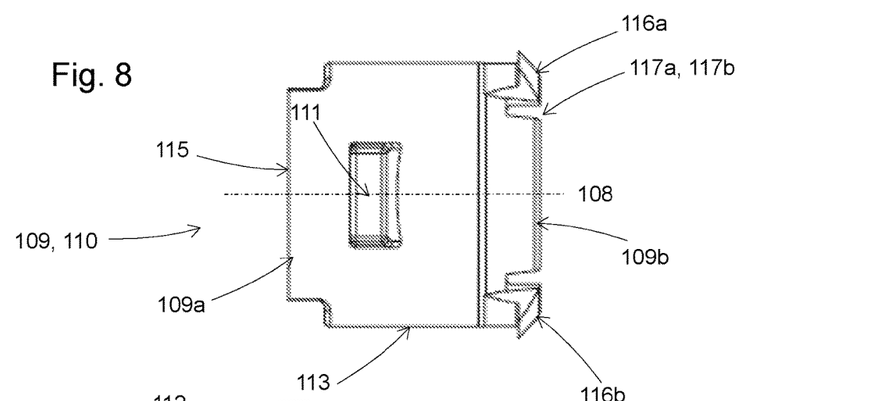
FIG. 8 shows a side view oil second embodiment of the locking means.
Figure 9:
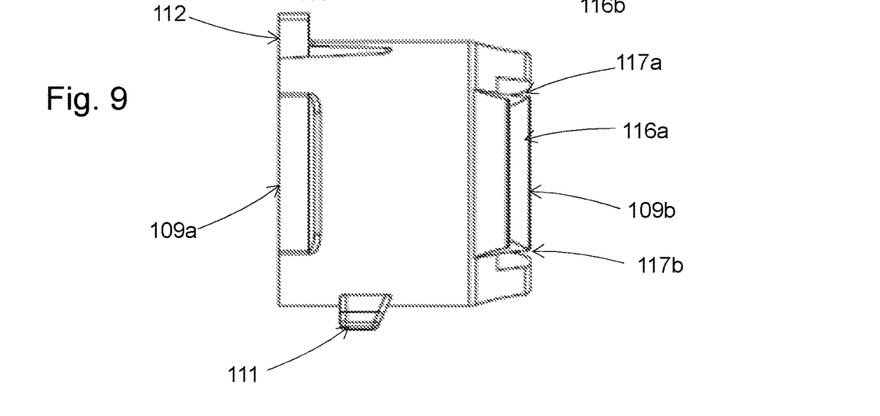
FIG. 9 shows another side view of the second embodiment of the locking means, the locking means being turned 90 degrees compared to FIG. 8
Figure 10:
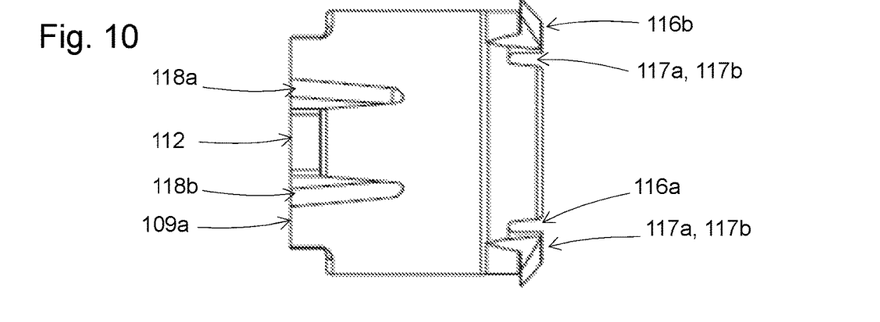
FIG. 10 shows another side view of the second embodiment, wherein the locking means has been turned 180 degrees compared to FIG. 8
Figure 11:
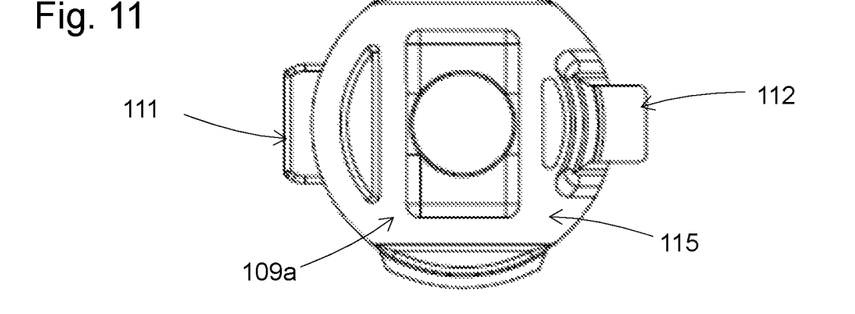
FIG. 11 shows a side view from one short side of the second embodiment of the locking means.
Figure 12:
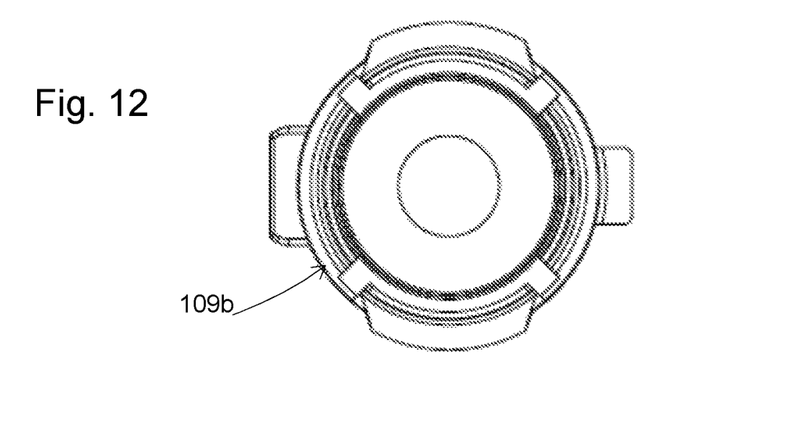
FIG. 12 shows a side view from the opposite short side compared to FIG. 11.
Figure 13:
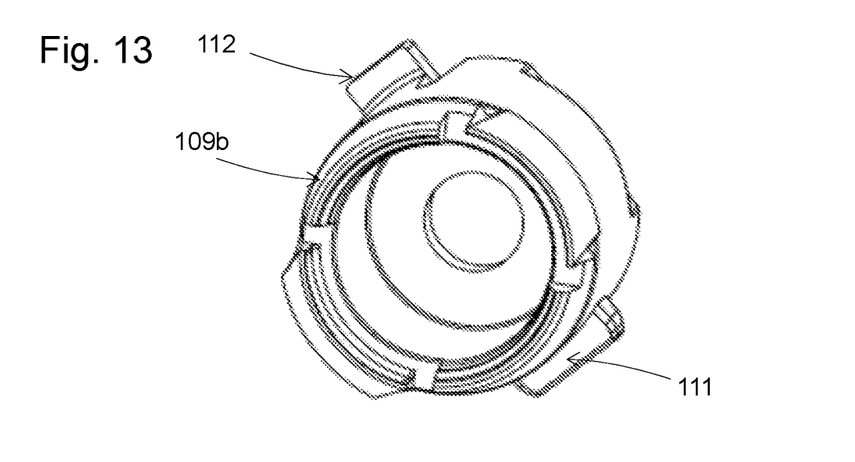
FIG. 13 shows a perspective view of the second embodiment of the locking means.

FIG. 7 shows a section view taken along the section A-A shown it FIG. 6. The internal groove 21 is preferably S-shaped, this to provide a clamping action when the locking means 9, 10 is arranged in the wall 3, 4, in the use position. Upon insertion of the locking means 9, 10 in the internal groove 21, the lock protrusion 11 is inserted in a first part 28 of the internal groove 21, where after the lock protrusion 11 is rotated such that the lock protrusion 11 is moved along the internal groove 21 over the edge 23 and into a second part 29 of the internal groove 21 and the securing protrusion 26 simultaneously engage with the internal side wall 24 and the stop 25. When the lock protrusion 11 engage with the second part 29 of the internal groove, the locking means is in the use position. The second part 29 of the internal groove is arranged closer to the internal side wall 24 than the first part 28 of the internal groove, which results in that when the locking means is rotated into the second part of the groove the clamping action of the pivot shaft is achieved.

Preferably the mounting assembly 1 is wholly or partly manufactured of a polymeric material. The mounting assembly 1 may in another embodiment be wholly or partly be manufactured of any another material such as (not shown) a metallic material.

Upon assembly of the mounting assembly 1, the pivot shaft 7, upon which the control pedal 2 is rigidly attached, is introduced between the walls 3, 4. One free end of the pivot shaft 7 is introduced into one of the openings 19 of the walls 3, 4, where after the pivot shaft 7 is angled down such that the other free end of the pivot shaft 7 may be introduced to the other wall 3, 4. Thereafter, a first 9 of the two locking means 9, 10 is arranged onto a first end of the pivot shaft 7 and a second 10 of the two locking means is arranged onto a second end of the pivot shaft. To lock the pivot shaft 7 in a desired location, each of the locking means 9, 10 is oriented such that the lock protrusion 11 is oriented to coincide with the indentation 20 of the opening 19, in the so called insertion position. Thereafter, the locking means 9, 10 is rotated from the first part 28 of the internal groove 21 until the lock protrusion 11 abuts against the edge 23 of the internal groove 21 in the second part 29 of the internal groove 21, in the so called use position. The rotation of the locking means 9, 10 from the insert position to the use position where the lock protrusion 11 abut against the edge 23 may be assisted by means of the grip 18 for enabling movement, such as a hex key.

FIGS. 8-17 show another embodiment of the invention. This embodiment also comprises locking means 109, 110, one for each end of the pivot shaft 7, the locking means 109, 110 being shown in FIGS. 8-13. The locking means 109, 110 is a hollow tube that has a substantially cylindrical shaped casing, which in a cross section taken along its longitudinal axis 108 is substantially U-shaped. The longitudinal axis 108 coincides with the axis of rotation 8 of the pivot shaft when the locking means is arranged onto the end of the pivot shaft. The locking means 109, 110 has a first axial end 109a where the U-shaped base is situated, and a second opposite axial end 109b. When mounted to the pivot shaft, the locking means 109, 110 is positioned onto the pivot shaft 7 with the second end 109b first. As for the first embodiment, the function of the locking means 109, 110 is to hold the pivot shaft 7 and its control pedal 2 securely in place between the walls 3, 4, (see FIGS. 1-2 and 17) but also to minimize the play between the pivot shaft 7 and the walls 3, 4 and to act as a bearing for the pivot shaft 7, when a user applies a force to the control pedal 2 by means of a foot, and the pivot shaft 7 rotates around the axis of rotation 8.

The locking means 109, 110 comprises a substantially cylindrical side wall 113 with a outer surface, and a closing wall 115 at the first axial end 109a. An inner diameter of the hollow tube of the locking means 109, 110 is larger than an outer diameter of the pivot shaft 7. This to allow the pivot shaft 7 to rotate within the locking means 109, 110 when the control pedal 2 is operated b a driver of the vehicle.

The locking means 109, 110 comprises a lock protrusion 111 arranged on the outer surface of the side wall 113 and protruding in a radial direction away from the outer surface of the side wall 113. The lock protrusion 111 is arranged to engage with a groove 121 of the walls 3, 4 of the mounting assembly 1 (see FIGS. 15 and 16). The lock protrusion 111 is located on the outer surface of the side wall 113, spaced apart from the first axial end 109a and the second axial end 109b but closer to the first axial end than the second axial end.

Figure 14:
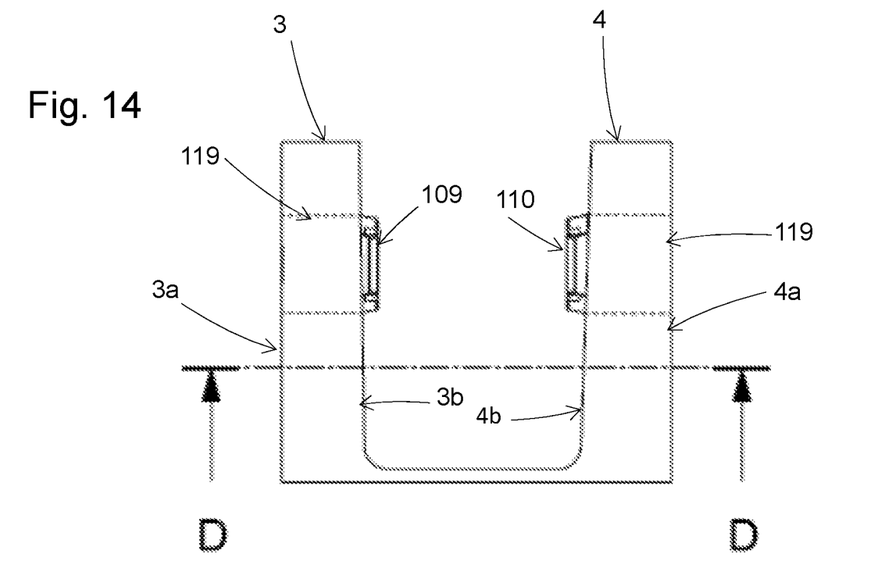
FIG. 14 shows a side view of the mounting assembly when the locking means have been inserted in the openings of the respective side wall, for the second embodiment.
Figure 15:
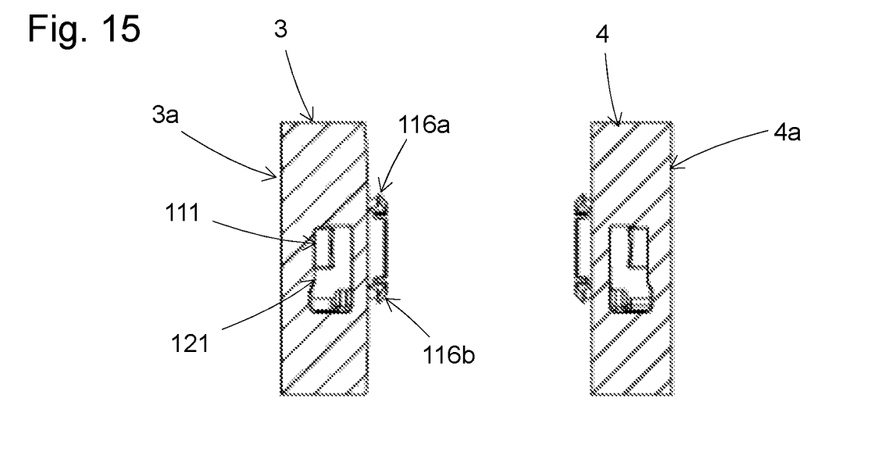
FIG. 15 shows across-sectional view of the mounting assembly of FIG. 14 according to section D-D.
Figure 16:
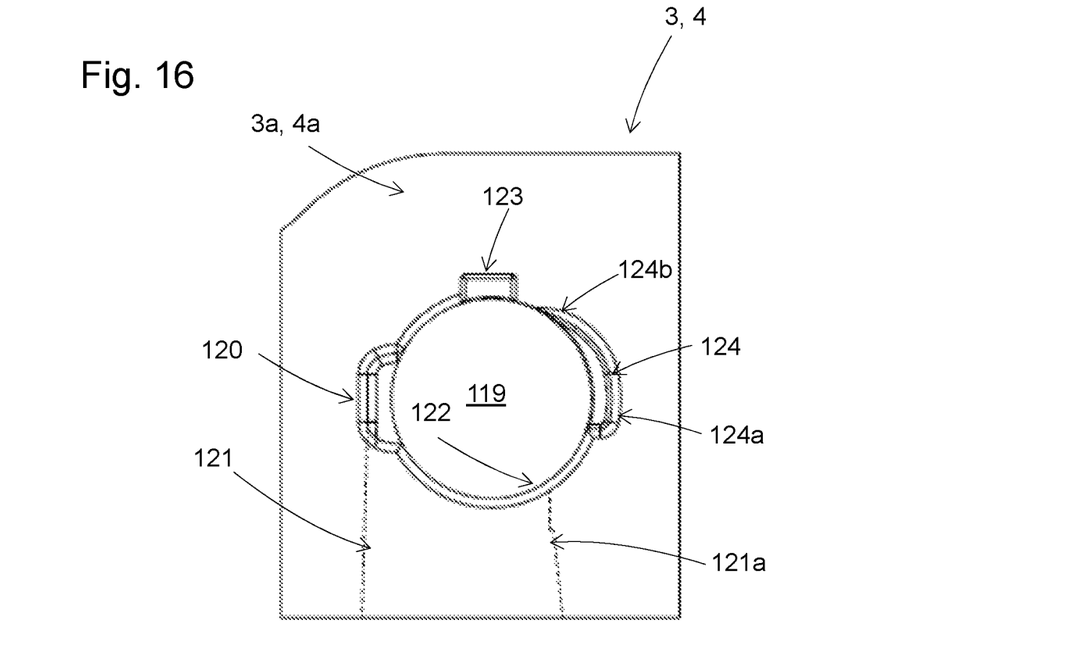
FIG. 16 shows a side view of any of the respective walls 3, 4, taken towards the outside of the respective wall.

As shown in FIGS. 14-16, each wall 3, 4 of the mounting assembly 1 is provided with a through opening 119. The openings 119 are mainly of circular design and are arranged for receiving opposite ends of the pivot shaft 7. The circumference of the through openings 11 are marked with dotted lines in FIG. 14. At the sides 3a, 4a of the mourning assembly walls 3, 4 facing away from each other, also called the outer side of the mounting assembly walls, there is an indentation 120 provided on the circumference of the opening 119 (see FIG. 16), directed from the circumference of the opening 119 radially outwards. When inserting the locking means 109, 110 into the opening 119, the lock protrusion 111 is inserted into the indentation 120. Further, at least one of the walls 3, 4 is provided with the internal groove 121 (marked with dotted lines in FIG. 16 as the groove is inside the wall, seen from the outer side 3a, 4a). The groove 121 starts at the indentation 120 in the wall opening 119 and extend partly around a circumferential envelope surface 122 of the opening 119 inside the respective wall 3, 4. The groove may extend in between 45-135 degrees around the circumferential surface 122, for example 90 degrees. After inserting die lock protrusion 111 into the indentation 120, the locking means 109, 110 is turned so that the lock protrusion 111 is moved into the groove 121 towards an inner end 121a of the groove into its use position where the pedal 2 can be pushed so that it pivots on its shaft 7 inside the locking means 109, 110. If the groove extends 90 degrees, the locking means may be turned approximately 90 degrees for reaching its use position.

The locking means 109, 110 further comprises a rotation prevention protrusion 112 arranged on the outer surface of the side wall 113 and protruding in a radial direction away from the outer surface of the side wall. The rotation prevention protrusion 112 is preferably arranged on the outer surface of the side wall 113 opposite the lock protrusion 111. The rotation prevention protrusion 112 is further preferably arranged at the first axial end 109a of the locking means 109, 110. Further, at the outer side 3a, 4a of each mounting assembly wall 3, 4, there is a second indentation 123, directed from the outer side 3a, 4a of the respective wall 3, 4 in a direction towards the inner side 3b, 4b. The second indentation 123 may be positioned 90 degrees displaced around the circumferential surface 122 compared to the indentation 120. When the lock protrusion 111 is positioned into the indentation 120, and the locking means 109, 110 is turned so that the lock protrusion 111 is moved into the groove 121 into its use position, the rotation prevention protrusion 112 is moved into the second indentation 123 into the use position of the locking means 109, 110.

The rotation prevention protrusion 112 is made resilient and positioned in relation to the second indentation 123 so that it snaps into the second indentation 123 when the locking means 109, 110 is moved into the use position. I.e., when the locking means is turned into the use position, the co-operation between the lock protrusion 111 and the groove 121 makes the rotation prevention protrusion 112 come into contact with the outer side 3a, 4a of the mounting assembly wall so that the rotation prevention protrusion 112 deflects inwards in a radial direction of the locking means. Further, when the locking means 109, 110 is fully inserted, the rotation prevention protrusion 112 will deflect outwards again as it snaps into the second indentation 123. The rotation prevention protrusion 112 may be made resilient by the locking means 109, 110 having two slits 118a, 118b arranged on opposite sides of the rotation prevention protrusion 112, extending in the axial direction from the first end 109a in a direction towards the second end 109b but not the whole way to the second end 109b.

For guiding the movement of the rotation prevention protrusion 112 into the second indentation 123, when turning the locking means into the use position, there may be a third indentation 124 at the circumference of the through opening 119 in a direction substantially perpendicular to the direction of the through opening. The third indentation 124 has a first deeper part 124a where the rotation prevention protrusion 112 is inserted and a second shallow part 124b closer to the second indentation 123. The depth of the third indentation 124 gradually decreases from its first to its second part in the direction towards the second indentation 123 in order to gradually flex the rotation prevention protrusion 112 inwardly as the locking means is rotated towards the use position, until the rotation prevention protrusion 112 snaps into the second indentation 123 when reaching the use position.

Thanks to the lock protrusion 111 and its cooperation with the groove 121, the axial position of the locking means in relation to the walls 3, 4 of the mounting assembly 1 secured. Further, thanks to the rotation prevention protrusion 112 and its cooperation with the second indentation 123, it is secured that the locking means cannot rotate in relation to the walls 3, 4 of the mountings. Consequently, a quick mounting of the pivot shaft into the walls of the mounting assembly can be achieved, which mourning can secure the position of the pivot shall axially between the walls of the mounting assembly, as well as secures that the locking means cannot rotate in relation to the walls of the mounting assembly.

The locking means 109, 110 may further comprise one or more axial securing protrusions 116a, 116b arranged on the outer surface of the side wall 113 and protruding in a radial direction away from the outer surface of the side wall. The axial securing protrusions 116a, 116b are preferably arranged at the second axial end 109b. The axial securing protrusions may be made resilient so that they can deflect inwards in a radial direction when the locking means are inserted into the openings 119. Further, when the locking means are fully inserted, the axial securing protrusions 116a, 116b will come out of the opening 119 at the inside 3b, 4b of the walls 3, 4. This can be seen e.g., in FIG. 15. Then the axial securing protrusions will deflect outwards again and therefore be situated directed towards the inside 3b, 4b of the walls 3, 4 providing an extra axial security hindering axial movement outwards of the locking means in relation to the walls 3, 4. The axial securing protrusion 116a, 116b may be made resilient by the locking means 109, 110 having slits 117a, 117b, e.g. two slits, arranged on opposite sides of each axial securing protrusion 116a, 116b, extending in the axial direction from the second end 109b towards the first end 109a.

Figure 17:
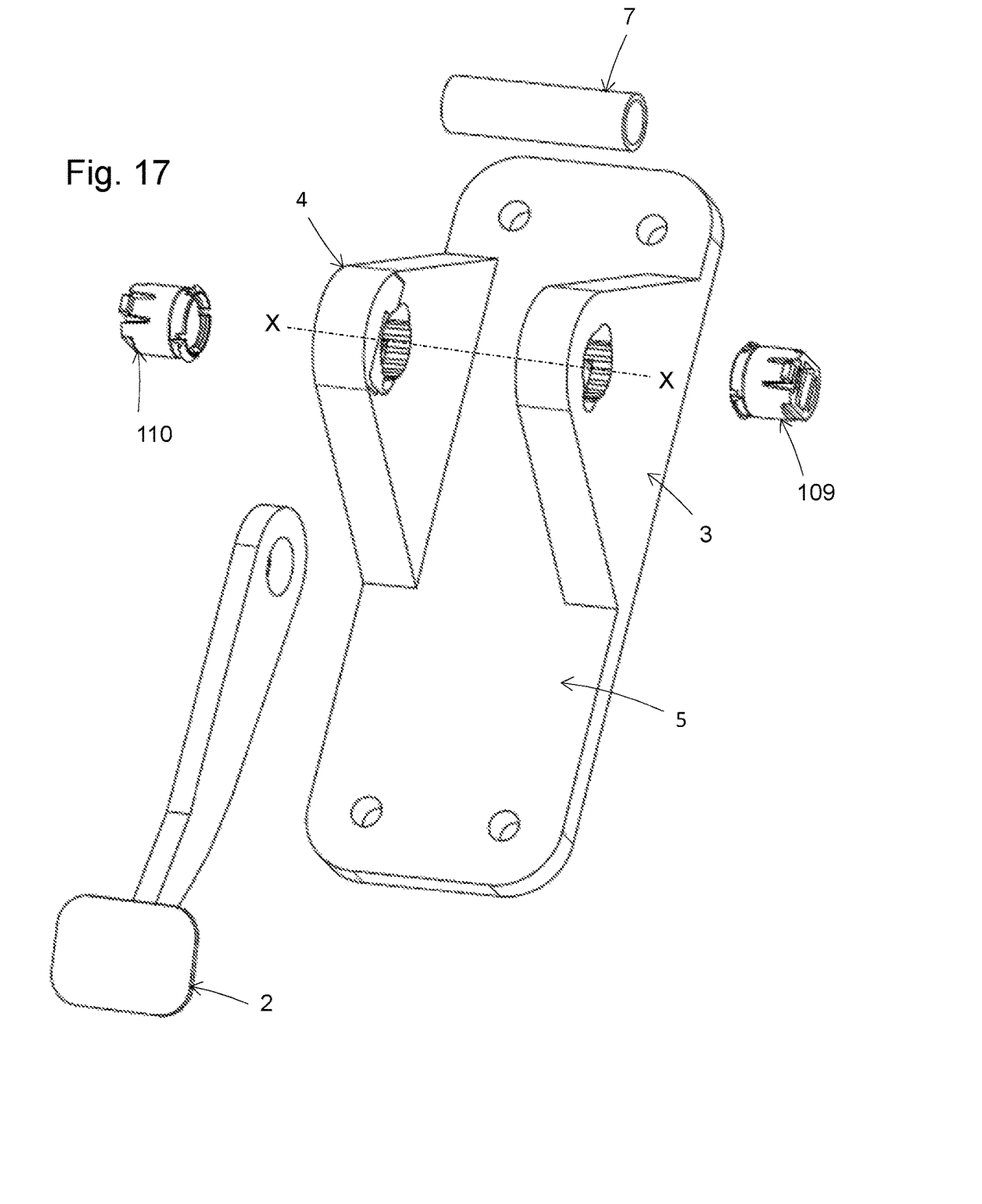
FIG. 17 shows an exploded perspective view of the mounting assembly according to the second embodiment.

FIGS. 14 and 15 show the mounting assembly when the locking means 109, 110 have been inserted into the openings 119 of the respective wall 3, 4. However, to simply the sketch, there is no shaft 7 shown inserted between the locking means 109, 110. FIG. 15 shows a cross-section at section D-D of FIG. 14. Here the lock protrusion 111 can be seen in the groove 121 when the locking means is in the use position. Further, this cross-section also shows that a first part 121b of the groove, closest to the first indentation 120, is wider than a second part 121c closer to the inner end 121a of the groove. I.e. the first pan 121b is wider in the direction from the outer side 3a, 3b of the wall to the inner side 3b, 4b of the wall. Also, a distance from the outer side 3a, 3b to the first part 121b is shorter than the distance from the outer side 3a, 3b to the second part 121c. Also, the wall of the second part of the groove is substantially parallel to the outer wall. FIG. 17 shows an exploded view of the mounting assembly of the second embodiment.

The locking means 109, 110 may have, an outer surface that is not exactly cylindrical, i.e. the side wall 113 may not be exactly cylindrical. Instead, the outer surface of the side wall may be provided with shallow ridges extending radially out from an imaginary circular circumferential surface of the side wall. The shallow ridges may further be extending in an axial direction along the locking means. This is to better take up play between the locking means 109, 110 and the circumferential surface of the opening 119.

The invention claimed is:

1. A mounting assembly for a control pedal of a vehicle comprising:
    two walls arranged in parallel in relation to each other,
    a pivot shaft extending between the walls,
    two locking means arranged to pivotally retain the pivot shaft between the walls,
    the control pedal being rigidly provided on the pivot shaft, wherein the control pedal and pivot shaft are rotatable around an axis of rotation,
    wherein the mounting assembly is provided with a joint which comprises at least one lock protrusion provided on at least one of the two locking means and an internal groove provided on at least one of the walls, wherein the internal groove and the at least one lock protrusion are arranged to engage with each other when the at least one of the two locking means is in a use position, and wherein the at least one of the two locking means further comprises a rotation prevention protrusion extending radially from an outer surface of the at least one of the two locking means, the rotation prevention protrusion being arranged to engage with a stop arranged at the at least one of the walls, when in the use position.

2. Mounting assembly according to claim 1, wherein the at least one lock protrusion is radially extending from the outer surface of the at least one of the two locking means.

3. Mounting assembly according to claim 1, wherein the at least one lock protrusion is provided with lock protrusion parts, wherein the lock protrusion parts comprise of a first lock protrusion part and a second lock protrusion part that are arranged to engage with the internal groove and a third lock protrusion part arranged to mesh with the stop at an inner side of the at least one of the walls, the third lock protrusion part being the rotation prevention protrusion.

4. Mounting assembly according to claim 3, wherein the first lock protrusion part and the second lock protrusion part are arranged as side parts and the third lock protrusion part is arranged centrally in between the lock protrusion parts.

5. Mounting assembly according to claim 3, wherein the stop is arranged on the inner side of the at least one of the walls protruding from the inner side of the at least one of the walls.

6. Mounting assembly according to claim 1, wherein the stop is an indentation formed in the at least one of the walls from an outer side of the at least one of the walls that is to co-operate with the rotation preventing protrusion.

7. Mounting assembly according to claim 6, wherein the indentation extends from an opening of the at least one of the walls.

8. Mounting assembly according to claim 6, wherein at least one of the two locking means further comprises one or more axial securing protrusions protruding in a radial direction from the outer surface of the at least one of the two locking means, the axial securing protrusions being arranged at a second axial end of the at least one of the two locking means.

9. Mounting assembly according to claim 6, wherein an axial securing protrusion and/or the rotation prevention protrusion is deflectable in a radial direction of the at least one of the two locking means.

10. Mounting assembly according to claim 1, wherein the at least one of the two locking means is provided with a grip for enabling movement of the at least one of the two locking means from an insertion position to the use position.

11. Mounting assembly according to claim 1, wherein each of the two walls is provided with a through opening with an internal shape for receiving an outer circumferential shape of a respective one of the two locking means.

12. Mounting assembly according to claim 11, wherein the pivot shaft has a respective end inserted into a respective one of the through openings and the respective one of the two locking means is positioned onto the respective end of the pivot shaft and inserted into the respective one of the through openings.

13. Mounting assembly according to claim 11, wherein the internal groove extends from a circumference of a respective one of the through openings.

14. Mounting assembly according to claim 11, wherein at least one of the walls has an indentation from which the internal groove extends into the at least one of the walls.

15. Mounting assembly according to claim 1, wherein the mounting assembly is manufactured of a polymeric material.

* * * * *